United States Patent
Sundaresan et al.

(10) Patent No.: US 7,602,774 B1
(45) Date of Patent: Oct. 13, 2009

(54) QUALITY OF SERVICE FOR SERVER APPLICATIONS

(75) Inventors: Ganesh Sundaresan, San Jose, CA (US); Raymond Lim, Los Altos Hills, CA (US); Shreyas Shah, San Jose, CA (US); Ariel Cohen, Cupertino, CA (US); Ming Wong, San Jose, CA (US)

(73) Assignee: Xsigo Systems, Mountain View, CA (US)

( * ) Notice: Subject to any disclaimer, the term of this patent is extended or adjusted under 35 U.S.C. 154(b) by 545 days.

(21) Appl. No.: 11/179,437

(22) Filed: Jul. 11, 2005

(51) Int. Cl.
*H04L 12/50* (2006.01)
(52) U.S. Cl. ........................ 370/381; 370/412
(58) Field of Classification Search ........................ None
See application file for complete search history.

(56) References Cited

U.S. PATENT DOCUMENTS

| | | | |
|---|---|---|---|
| 7,269,168 B2 * | 9/2007 | Roy et al. ............... | 370/374 |
| 7,502,884 B1 * | 3/2009 | Shah et al. ............... | 710/316 |
| 2005/0120160 A1 * | 6/2005 | Plouffe et al. ............... | 711/1 |
| 2005/0198523 A1 * | 9/2005 | Shanbhag et al. ............... | 713/200 |
| 2007/0067435 A1 * | 3/2007 | Landis et al. ............... | 709/224 |

OTHER PUBLICATIONS

Xu et al, Performance virtualization for large-scale storage systems, IEEE, 10 pages, 2003.*
Figueiredo et al, "Resource Virtualization Renaissance", May 2005, IEEE Computer Society, pp. 28-31.
Ajay V. Bhatt, "Creating a Third Generation I/O Interconnect", Intel® Developer Network for PCI Express* Architecture, www.express-lane.org, pp. 1-11.
Ajay V. Bhatt, "Creating a Third Generation I/O Interconnect," Intel® Developer Network for PCI Express* Architecture, www.express-lane.org, printed on Aug. 22, 2005, pp. 1-11.

* cited by examiner

*Primary Examiner*—Frank Duong
(74) *Attorney, Agent, or Firm*—Weaver Austin Villeneuve & Sampson LLP

(57) ABSTRACT

Methods and apparatus are provided for allowing quality of service (QoS) configuration for storage applications running on servers connected to a storage area network (SAN). Resources such as host bus adapters (HBAs) are offloaded from individual servers onto a resource virtualization switch. Servers are connected to the resource virtualization switch using an I/O bus connection. The resource virtualization switch provides storage applications running on connected servers with different quality of service levels. The resource virtualization switch can also apply traffic shaping policies associated with QoS.

17 Claims, 11 Drawing Sheets

--PRIOR ART--

QUALITY OF SERVICE FOR SERVER APPLICATIONS

BACKGROUND OF THE INVENTION

1. Field of the Invention

The present invention relates to quality of service. In one example, the present invention relates to methods and apparatus for providing quality of service (QoS) for server storage applications.

2. Description of Related Art

Conventional servers connect to storage area networks (SANs) through switches such as fibre channel switches. Storage applications running on conventional servers interact with switches using individual device drivers associated with resources such as Host Bus Adapters (HBAs). Traffic from multiple storage applications running on a server is sent using a shared queue associated with an HBA and received using a shared queue associated with the HBA. In many instances, traffic from different storage applications is not differentiated at a device driver and no QoS mechanisms can be applied. Although a SAN may have QoS applied to traffic received from different servers, storage applications running on the same server do not have QoS available.

In many instances, the input/output (I/O) requests from different server applications are aggregated onto shared queues. Delays in handling I/O requests for a particular application may result in delays for all applications. In some instances, an application that requires critical response time may be blocked or slowed down by a less critical request.

Also, heretofore there has been no control of bandwidth allocation on a server application basis. As such, a single server storage application can use up all of the available bandwidth.

Therefore, it is desirable to extend QoS to the application level in a server. It is also desirable to provide QoS at the application level across servers with shared I/O connectivity.

SUMMARY OF THE INVENTION

Methods and apparatus are provided for virtualizing resources such as host bus adapters connected to a fibre channel fabric. Resources are offloaded from individual servers onto a resource virtualization switch. Servers are connected to the resource virtualization switch using an I/O bus connection. Servers are assigned resources such as virtual host bus adapters and share access to physical host bus adapters included in the resource virtualization switch. Multiple queues with different QoS characteristics, for example, priority, bandwidth or a combination thereof, for server application I/O requests are included within the resource virtualization switch.

In one aspect, the invention features a resource virtualization switch coupled to a fiber channel fabric. The resource virtualization switch comprises a resource virtualization switch platform operable to map communications form a plurality of servers to a selected one of a plurality of port adapters connected to a fiber channel fabric. The resource virtualization switch further includes a plurality of queues having different quality of service (QoS) characteristics to provide QoS for an application request by the plurality of servers for a storage recourse associated with the fiber channel fabric.

Various implementations of the invention may include one or more of the following features. The QoS characteristics include priority, bandwidth, or a combination of priority and bandwidth. Multiple applications use the same storage resource and the resource is assigned an alias. The storage resource is part of a storage network.

In another aspect, the invention is directed to a recourse virtualization switch comprising a plurality of port adapters. The port adapters include at least a first port adapter and a second port adapter. The port adapters are connected to a fiber channel fabric. The fiber channel fabric includes a plurality of fiber channel ports associated with fiber channel switches. An I/O bus switch is connected to a plurality of servers including at least a first server and a second server. A resource virtualization switch platform is operable to map communications from the first server and the second server onto the first port adapter. The resource virtualization switch platform includes multiple queues with different QoS characteristics to provide QoS for storage applications on the first and second servers.

Various implementations of the invention may include one or more of the following features. The port adapters are Host Bus Adapters (HBAs). The first server includes a first virtual HBA driver. The first server includes a second virtual HBA driver. The first and second virtual HBA drivers are used for redundancy and load sharing. The first and second virtual HBA drivers are used for multipathing. The first and second virtual HBA drivers are coupled to different resource virtualization switches. The first port adapter is coupled to a first fibre channel port and the second port adapter is coupled to a second fibre channel port. The I/O bus switch is a PCI Express switch.

The invention can include one or more of the following advantages. QoS is provided at the application level of a server. QoS is also provided across multiple servers with shared SAN I/O connectivity. As such, storage application I/O requests across multiple servers or within a server can be configured or shaped according to the QoS requirements. Additionally, by the use of aliasing even server applications sharing the same storage resource can be provided with QoS.

A further understanding of the nature and advantages of the present invention may be realized by reference to the remaining portions of the specification and the drawings.

BRIEF DESCRIPTION OF THE DRAWINGS

The invention may best be understood by reference to the following description taken in conjunction with the accompanying drawings, which are illustrative of specific embodiments of the present invention.

DETAILED DESCRIPTION OF SPECIFIC EMBODIMENTS

Figure 1:
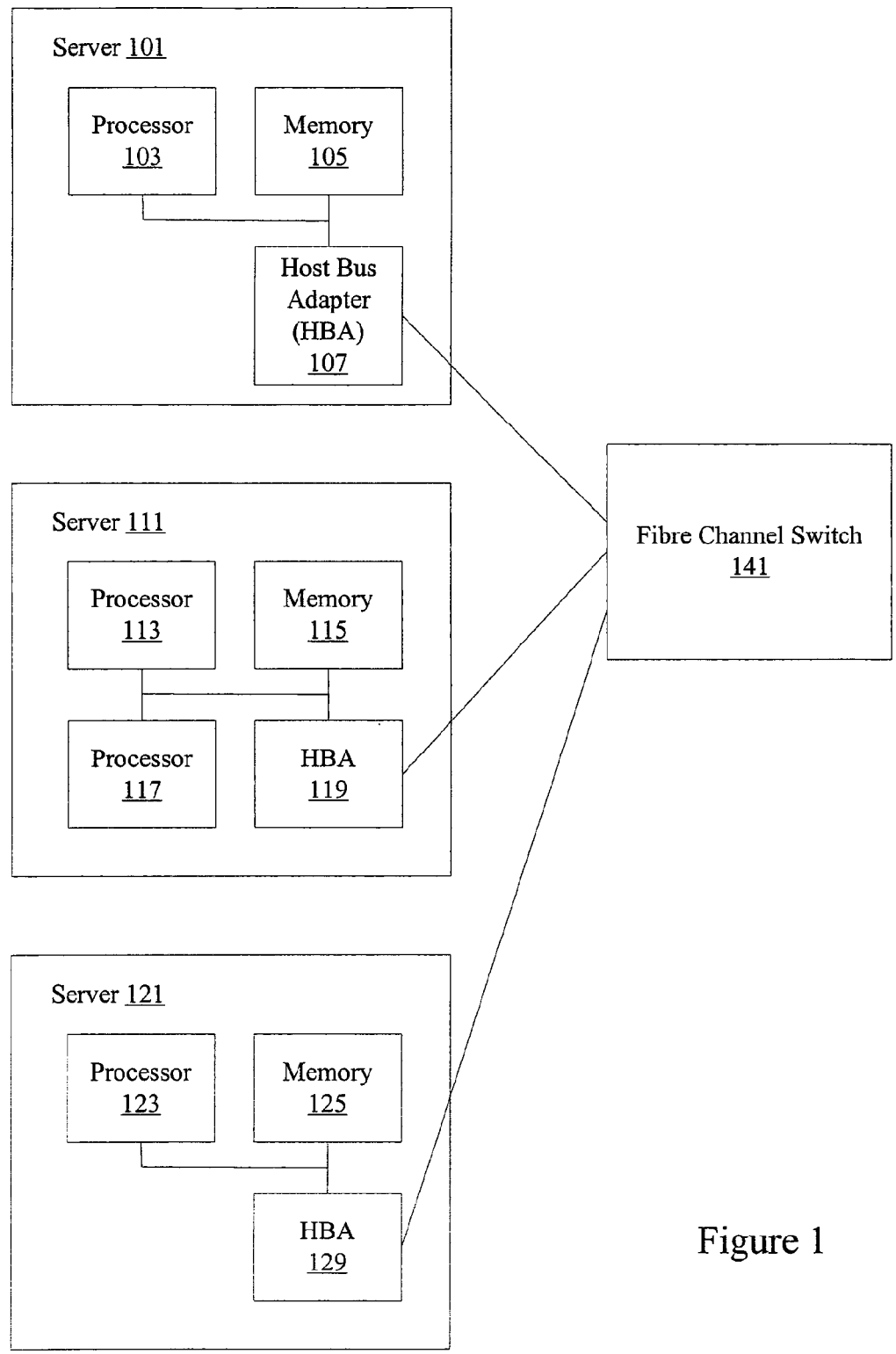
FIG. 1 is a diagrammatic representation showing a typical server configuration.

Reference will now be made in detail to some specific examples of the invention including the best modes contemplated for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of Peripheral Control Interface (PCI) Express and fibre channel storage area networks (SANs). However, it should be noted that the techniques of the present invention can be applied to a variety of different standards and variations to PCI Express and fibre channel storage area networks (SANs). In the following description, numerous specific details are set forth in order to provide a thorough understanding of the present invention. The present invention may be practiced without some or all of these specific details. In other instances, well known process operations have not been described in detail in order not to unnecessarily obscure the present invention.

Furthermore, techniques and mechanisms of the present invention will sometimes be described in singular form for clarity. However, it should be noted that some embodiments can include multiple iterations of a technique or multiple instantiations of a mechanism unless noted otherwise. For example, a processor is used in a variety of contexts. However, it will be appreciated that multiple processors can also be used while remaining within the scope of the present invention unless otherwise noted.

A server or computing system generally includes one or more processors, memory, as well as other peripheral components and peripheral interfaces such as, HBAs, hardware accelerators, network interface cards (NIC), graphics accelerators, disks, etc. Storage applications can be configured to run on servers connected to storage area networks (SANs) using resources such as HBAs.

In conventional servers, different storage applications running on a server send data to a SAN using a shared transmit queue associated with an HBA. Data is received using a shared receive queue associated with an HBA. Consequently, disparate applications, such as storage area network disk backup applications and real-time video applications, all share the same transmit and receive queues.

Storage application data from different applications is handled in an undifferentiated manner at various server device drivers. For example, requests may be handled in a first in first out (FIFO) manner, so that a request from a low priority backup application may block a request from a real-time video application. In order to provide adequate resources for storage applications running on each server, resources are typically over-provisioned. That is, more bandwidth is provided than is typically needed. For example, HBAs are typically arranged to provide 1G, 2G or 4G of bandwidth. However, typical servers rarely use that amount. More network interface bandwidth is allocated than is typically used simply to handle worst-case or expected worst-case scenarios.

The techniques and mechanisms of the present invention recognize that resources can be allocated in a more efficient manner while providing mechanisms for applying traffic shaping policies and QoS on a per storage application basis. Resources such as HBAs and NICs can be offloaded onto a resource virtualization appliance or device, or resource virtualization switch. In one example, the resource virtualization switch creates an on-demand provisioned and traffic engineered data center by seamlessly integrating with existing hardware and software infrastructure. The resource virtualization switch receives requests from individual servers over a bus interface such as PCI Express and determines what resources to provide to handle individual requests. Requests may be distinguished on a per application basis and assigned different QoS levels. Traffic shaping and other policing mechanisms can also be applied. For example, a first application running on a first server may request to transmit data over a local area network. The request is routed to the resource virtualization switch that then determines how to handle the request. In one example, a bulk data transfer request is forwarded as a low priority request to the NIC corresponding to the first server. In another example, an audio streaming request is forwarded as a high priority requests to an HBA corresponding to the first server.

According to various embodiments, applications are assigned different QoS characteristics by using different queues at a resource virtualization switch based on a QoS category. In one example, a QoS category is based on a storage application. In another example, a QoS level is based on a target identifier and a logical unit (LUN) identifier of a storage device, and consequently can be applied for different requests associated with even the same application. Device aliasing can be used to further differentiate traffic. Device aliasing allows applications using a single storage device to present different target identifiers and different LUN identifiers. Bandwidth usage is enforced by having a resource virtualization switch apply hardware traffic shaping to throttle applications using flow control mechanisms.

Access to resources such as I/O and hardware acceleration resources remains at the bus level. Any mechanism allowing interconnection of components in a computer system is referred to herein as a bus. Examples of buses include PCI, PCI Express, Vesa Local Bus (VLB), PCMCIA, and AGP. For example, master components (e.g. processors) initiate transactions such as read and write transactions over buses with slave components (e.g. memory) that respond to the read and write requests. Buses in a server are typically associated with a memory space to allow for use of the read and write transactions. Any device having one or more processors that are able to access a shared memory address space is referred to as a server, computer, or computing system.

In one example, a server includes multiple processors that can all access a shared virtual or physical memory space. Although each processor may own separate cache lines, each processor has access to memory lines in the memory address space. A server or computing system generally includes one or more processors, memory, as well as other peripheral components and peripheral interfaces such as HBAs, hardware accelerators, NICs, graphics accelerators, disks, etc. A processor can communicate with a variety of entities including a fibre channel fabric.

According to various embodiments, HBAs are included in a resource virtualization switch connected to multiple servers using a bus interface such as PCI Express. The bus interface provides a low latency, high bandwidth connection between the multiple servers and the fibre channel (FC) HBA in the resource virtualization switch. The resource virtualization switch aggregates several server memories into a unified memory or an aggregated memory address view to a fibre channel controller and this enables the sharing of a physical fibre channel HBA among several servers.

In one embodiment, buffers associated with the resource virtualization switch are provided to hide PCI Express latency while extending and adapting fibre channel HBA access patterns to the PCI Express fabric. The small computer system interface (SCSI) layer of the multiple servers including target discovery is completely decoupled from the fibre channel HBA. Targets discovered from the fibre channel HBA are controlled and discovered by the resource virtualization switch. This enables multiplexing several SCSI initiators from different servers onto a single fibre channel HBA. According to various embodiments, the resource virtualization switch allows on the fly addition, deletion and adjustment of virtual HBA bandwidth allocated to each server. For example, a single 4G HBA can be split into 2G, 1G, and 1G and allocated to three separate servers.

An administrator can provision and partition resources at the resource virtualization switch based on particular needs and requirements. QoS and traffic engineering schemes can be implemented at the bus level. Application I/O requests for storage resources across multiple servers or within a server can be configured according to QoS requirements established by the resource virtualization switch. Traffic associated with particular devices or servers can be given priority or guaranteed bandwidth. Application I/O requests for resources of other networks, such as mainframe serial ATA networks, can also be configured according QoS requirements established by the resource virtualization switch.

The total amount of resources can be decreased while increasing resource utilization. The resource virtualization mechanism can be introduced into existing server racks and farms with little disruption to system operation.

FIG. 1 is a diagrammatic representation showing a conventional implementation for connecting servers to a fibre channel fabric. Server 101 includes a processor 103, memory 105, and HBA 107. The processor 103 communicates with other components and interfaces in the system using an I/O bus and associated I/O controllers. In typical implementations, communications between components and interfaces in server 101 occur over an I/O bus such as PCI. Server 111 includes processors 113 and 117, memory 115, and HBA 119. Communication within server 111 similarly occurs over one or more I/O buses. Server 121 includes a processor 123, memory 125, and HBA 129. In order to allow connection with a fibre channel fabric through fibre channel switch 141, HBAs 107, 119, and 129 are provided. In one example, a processor 103 is configured to drive HBA 107 to initiate conventional fibre channel fabric login (flogi) and port login (plogi) processes to connect to a fibre channel switch 141. Similarly, processors 113 and 117, and processor 123 are configured to drive HBAs 119 and 129 to initiate the flogi and plogi protocols. During the login processes, parameters and other information may be exchanged with the fibre channel fabric and other fibre channel fabric connected ports.

The fibre channel switch 141 allows routing of traffic among the various storage resources of a SAN. Each storage resource is assigned a logical unit number (LUN) identifier (id) and a target id. As discussed below, a storage resource may also have an alias.

The various HBAs 107, 119, and 129 are also assigned port world wide names (pwwns) and fibre channel identifiers (fc_ids). Each HBA encapsulates data into fibre channel frames for transmission to the fiber channel switch 141. Encapsulation may involve adding appropriate fibre channel headers and addresses. Each HBA is also configured to remove fibre channel headers and addresses and provide data to an associated processor over a system bus when fibre channel frames are received from a fabric.

To provide for reliability, servers 101, 111, and 121 may include multiple HBAs to allow effective switchover in the event one HBA fails. Furthermore, many servers may have redundant lines physically connecting the various HBAs to the fibre channel switch 141. Multiple fibre channel switch ports are also required. The resource allocation and system management inefficiencies are magnified by the physical complexities of routing redundant lines. Although only HBAs are noted, each server 101, 111, and 121 may also include NICs and hardware accelerators.

Figure 2:
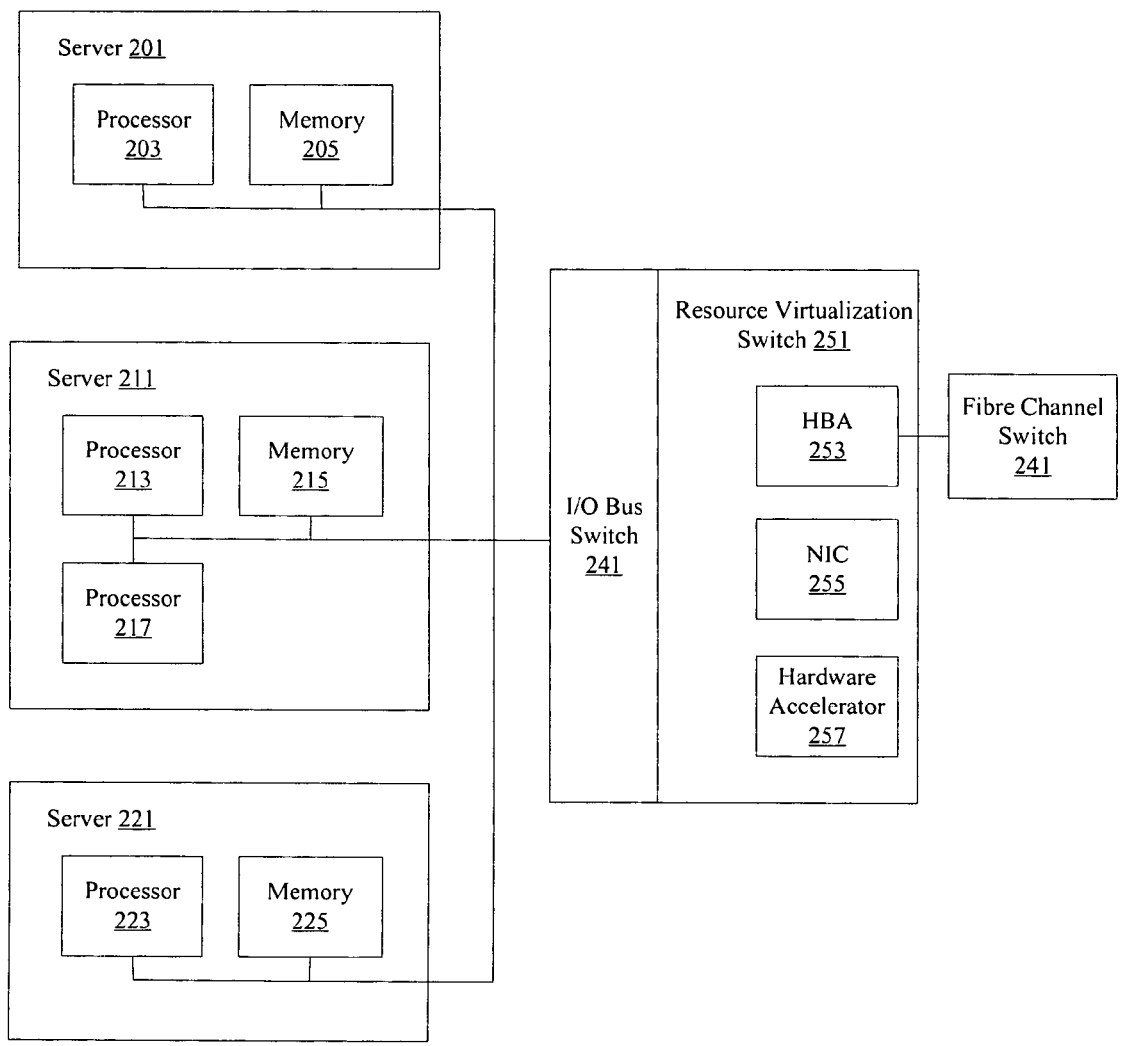
FIG. 2 is a diagrammatic representation showing multiple servers having virtualized resources.

FIG. 2 is a diagrammatic representation showing separate servers connected to a resource virtualization switch 251. Server 201 includes processor 203 and memory 205. Server 211 includes processors 213 and 217, and memory 215. Server 221 includes only processor 223 and memory 225. Components and peripherals in each server 201, 211, and 221 are connected using one or more I/O buses. According to various embodiments, the I/O bus is extended to allow interconnection with other servers and external entities through an I/O bus interconnect such as an I/O bus switch 241. In one example, server 201 no longer uses addresses such as port world wide names (pwwns) associated with an HBA or media access control (MAC) addresses associated with a NIC to communicate with other servers and external networks, but each server is instead configured to communicate with a resource virtualization switch 251 using an I/O bus switch 241.

An I/O bus switch 241 may be a standalone entity, integrated within a particular server, or provided with a resource virtualization switch 251. According to various embodiments, components such as HBA 253, NIC 255, and hardware accelerator 257, can be offloaded from servers 201, 211, and 221 onto a resource virtualization switch 251. The resources including NIC 255 and HBA 253 are maintained in a shared and virtualized manner on the resource virtualization switch 251. Links can be provided between the resource virtualization switch and external switches such as fibre channel switch 241. According to various embodiments, the resource virtualization switch 251 includes control logic that drives an HBA 253 to initiate flogi and plogi processes independently from server 201, 211, and 221. In some instances, flogi and plogi processes may be implemented by a resource virtualization switch 251 control plane even before any servers 201, 211, and 221 are connected to the resource virtualization switch.

According to various embodiments, a series of servers is connected to the resource virtualization switch using a PCI Express bus architecture. In some cases, a PCI Express bridge is used to increase compatibility with some existing systems. However, a PCI Express bridge is not necessarily needed. By using a resource virtualization switch, the number of resources and links can be significantly reduced while increasing allocation efficiency.

Figure 3:
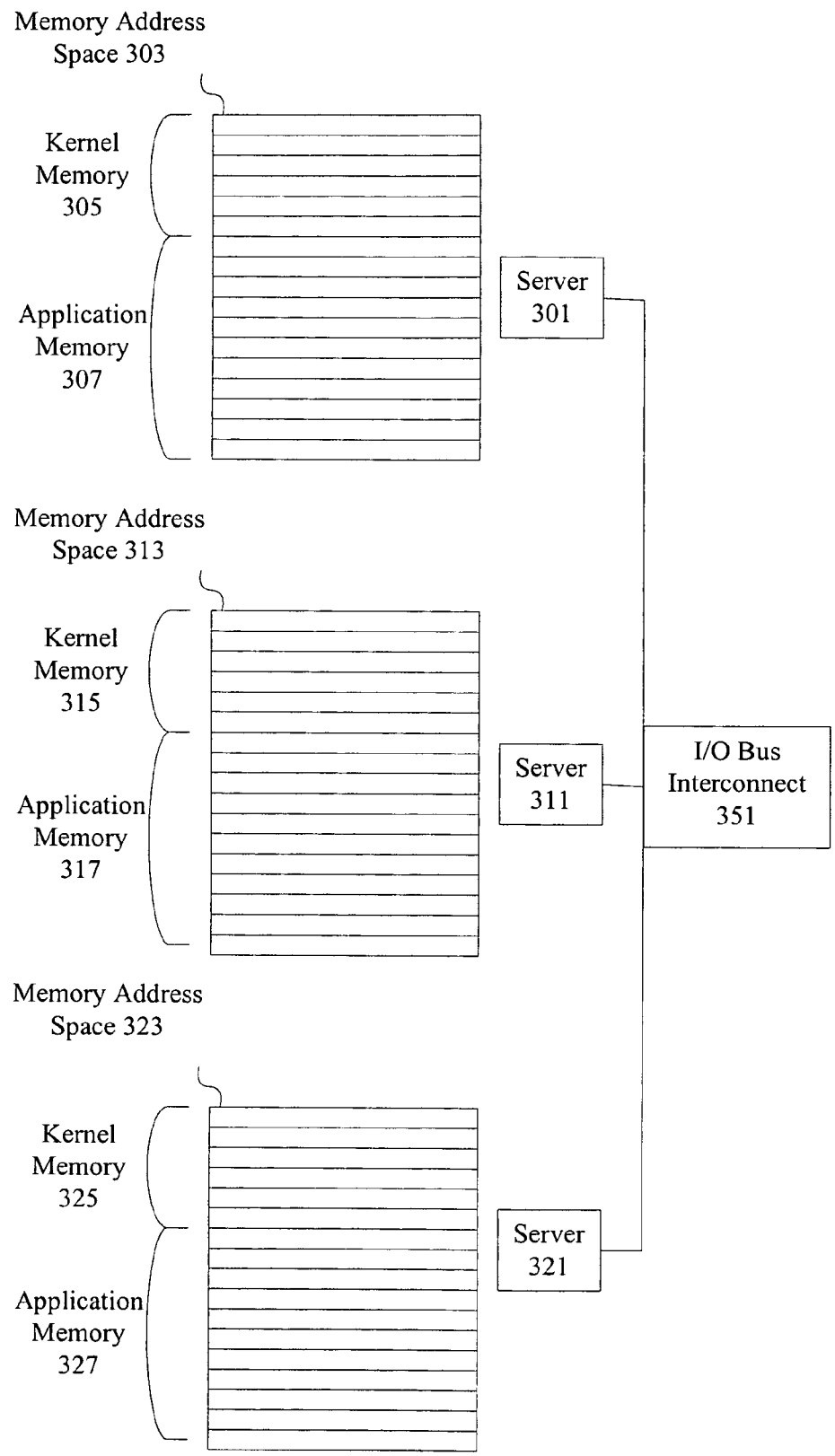
FIG. 3 is a diagrammatic representation depicting a typical layer model for transmission over a bus protocol.

FIG. 3 is a diagrammatic representation showing separate servers each associated with a memory address space. According to various embodiments, server 301 includes a memory address space 303 with kernel memory 305 and an application memory 307. The memory address space 303 may be a physical memory address space or a virtual memory address space. Server 301 may include one or more processors with access to the memory address space. Server 311 includes a memory address space 313 with a kernel memory 315 and an application memory 317. The memory address space 313 may be a physical memory address space or a virtual memory address space. Server 311 may include one or more processors with access to the memory address space. Server 321 includes a memory address space 323 with a kernel memory 325 and an application memory 327. The memory address space 323 may be a physical memory address space or a virtual memory address space. Server 321 may include one or more processors with access to the memory address space.

According to various embodiments, the separate servers 301, 311, and 321 are connected to a resource virtualization switch using an I/O bus. In one embodiment, an I/O bus interconnect 351, such as an I/O bus switch, is used to connect the separate servers to external entities such as a fibre channel fabric. The I/O bus interconnect 351 is associated with logic that allows aggregation of the memory address spaces 303, 313, and 323. Any logical address space that includes the memory address spaces of multiple computer systems or servers is referred to herein as an aggregated memory address space. In one embodiment, an aggregated memory address space is managed by an I/O bus switch or by a resource virtualization switch.

When a transaction occurs in a memory address space 313, the resource virtualization switch can identify the transaction as a server 311 transaction. The memory address space regions can be used to classify traffic. For example, data received from a server 311 in memory address space 313 can be assigned a particular fibre channel exchange identifier (OX_ID) for transmission onto a fibre channel fabric. A fibre channel exchange identifier is one conventional fibre channel parameter that can be used to distinguish traffic. When a reply to the transmission is received from the fibre channel fabric, the exchange identifier is used to determine which server the resource virtualization switch forwards the reply to. In one example, a table listing servers, memory address spaces, and fibre channel exchange identifiers is maintained by a resource virtualization switch. When a server writes a data block to a resource virtualization switch, an exchange identifier is assigned to fibre channel frames for transmitting that data block. Reply messages with the same exchange identifier can then be appropriately forwarded to the originating server. It will be recognized that a variety of parameters other than exchange identifiers can be used to classify traffic.

It should also be noted that each server 301, 311, and 321 may be embodied in separate computer cases. In other examples, each server may be embodied in a card, a blade, or even a single integrated circuit (IC) device or portion of an IC device. Techniques for performing interconnection can be implemented on one or more application specific integrated circuits (ASICs) and/or programmable logic devices (PLDs). The entire interconnection mechanism can be provided on a server, a card, a chip, or on a processor itself.

Figure 4:
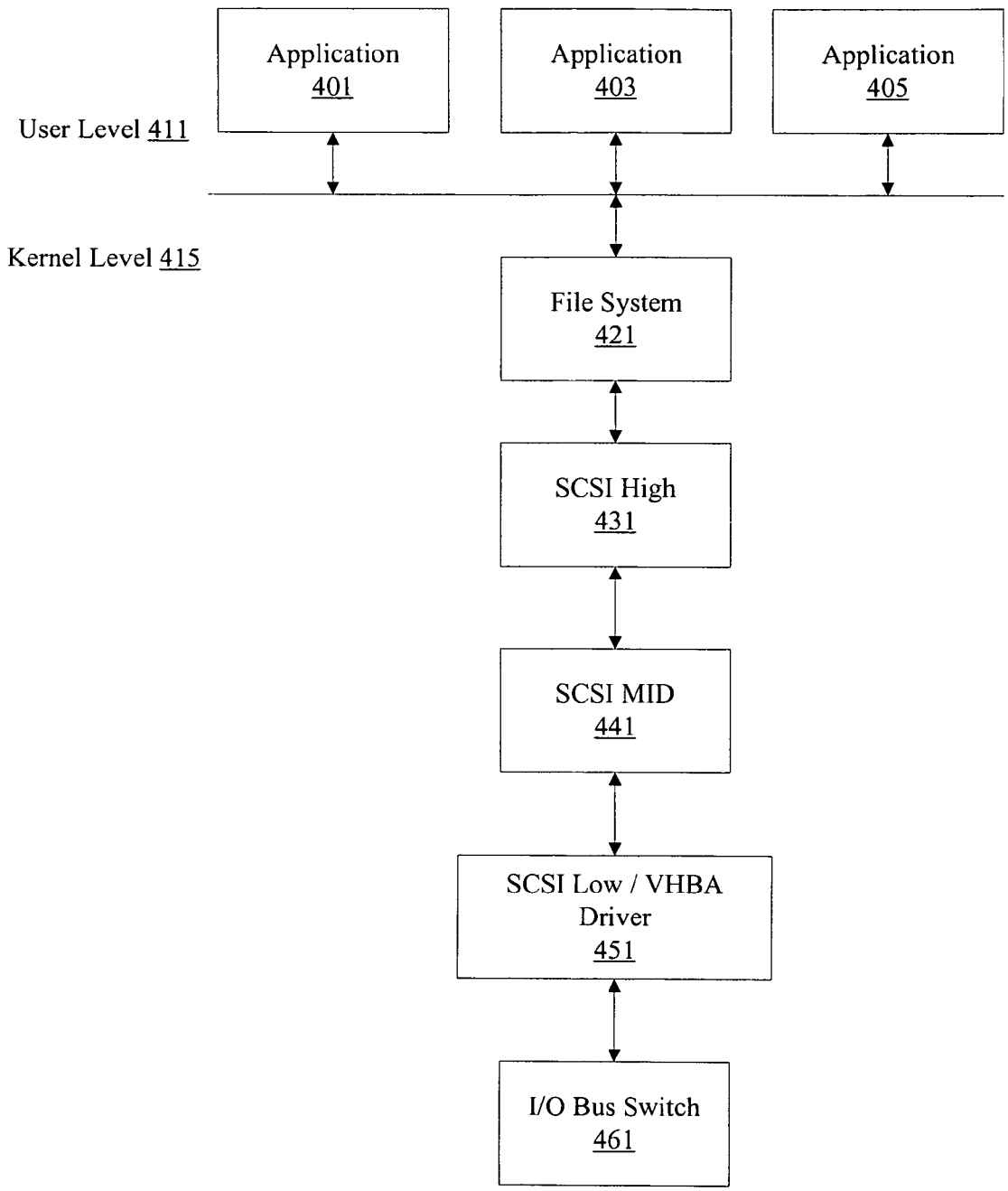
FIG. 4 is a diagrammatic representation depicting a layer model using a virtual device driver.

FIG. 4 is a diagrammatic representation showing one example of a software architecture using the resource virtualization switch of the present invention where a virtualized HBA is used for communication with a fibre channel fabric. A user level 411 includes multiple applications 401, 403, and 405. The user level 411 is coupled to a kernel level 415. The kernel level includes a file system 421 and various transport layer protocols such as SCSI high level protocol 431, a SCSI mid-level protocol 441, and a SCSI low level protocol 451. In conventional implementations, a SCSI low level protocol is associated with an HBA driver that operates an HBA. However, the techniques of the present invention contemplate replacing the conventional HBA device driver with a modified device driver or a virtual device driver. Any device driver configured to drive a resource virtualization switch is referred to herein as a modified or virtual device driver. The modified or virtual device driver 451 is configured to allow kernel access to a virtual peripheral. The kernel continues to operate as though it has access to a peripheral such as an HBA included in the server. That is, the kernel may continue to operate as though the HBA can be accessed directly over the bus without using a resource virtualization switch.

However, the virtual device driver supplied is actually driving access to an I/O bus switch 461 and an associated resource virtualization switch. The I/O bus switch 461 and associated resource virtualization switch can then perform processing to determine how to handle the request to access a particular resource such as an HBA. In some examples, the resource virtualization switch can apply traffic shaping or prioritization schemes to various requests, or assign flows to particular HBAs with predetermined bandwidth.

By using a virtualized device driver along with PCI Express, HBAs, hardware accelerators such as eXtensible Markup Language (XML) accelerators, security accelerators, digital signal processors (DSPs), and graphics accelerators can be virtualized while allowing rapid and efficient access in a secure local bus environment. Quality of service and traffic engineering can be applied at the bus level. Furthermore, resources can be flexibly provisioned and reconfigured.

Figure 5:
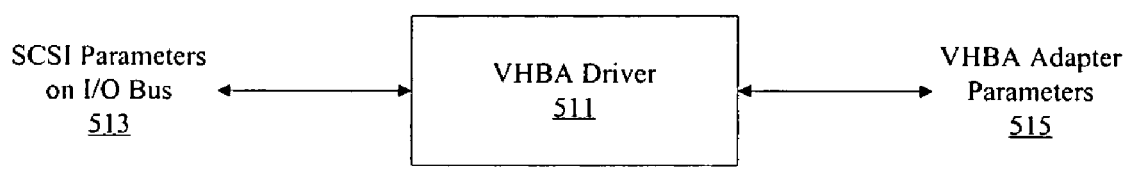
FIG. 5 is a diagrammatic representation showing one example of a virtual host bus adapter (VHBA) driver.

FIG. 5 is a diagrammatic representation showing one example of a virtual HBA (VHBA) driver. Any mechanisms operating a device that allows the mapping of multiple servers over an I/O bus to a single HBA device is referred to herein as a VHBA driver. When a conventional HBA card or device is connected to a computer system over a bus, a number of SCSI parameters 513 are configured for that HBA. A VHBA driver 511 keeps the same set of SCSI parameters 513 to allow a VHBA driver to operate in conventional systems. In one example, a processor in a server uses the same set of parameters and formats used for an HBA driver to operate a VHBA driver. According to various embodiments, both an HBA and a VHBA driver 511 use the same SCSI parameters 513. A scsi-reset-delay integer specifies the recovery time in milliseconds for a reset delay by either a SCSI bus or SCSI device. A scsi-options property is an integer specifying a number of options through individually defined bits.

According to various embodiments, the VHBA adapter parameters 515 include SCSI parameters 513. Adapter parameters may include disconnect, link, synchronization, and parity. Adapter parameters allow communication with a resource virtualization switch. In one embodiment, adapter parameters also include rate, transfer rate, bus number, and slot number.

Figure 6:
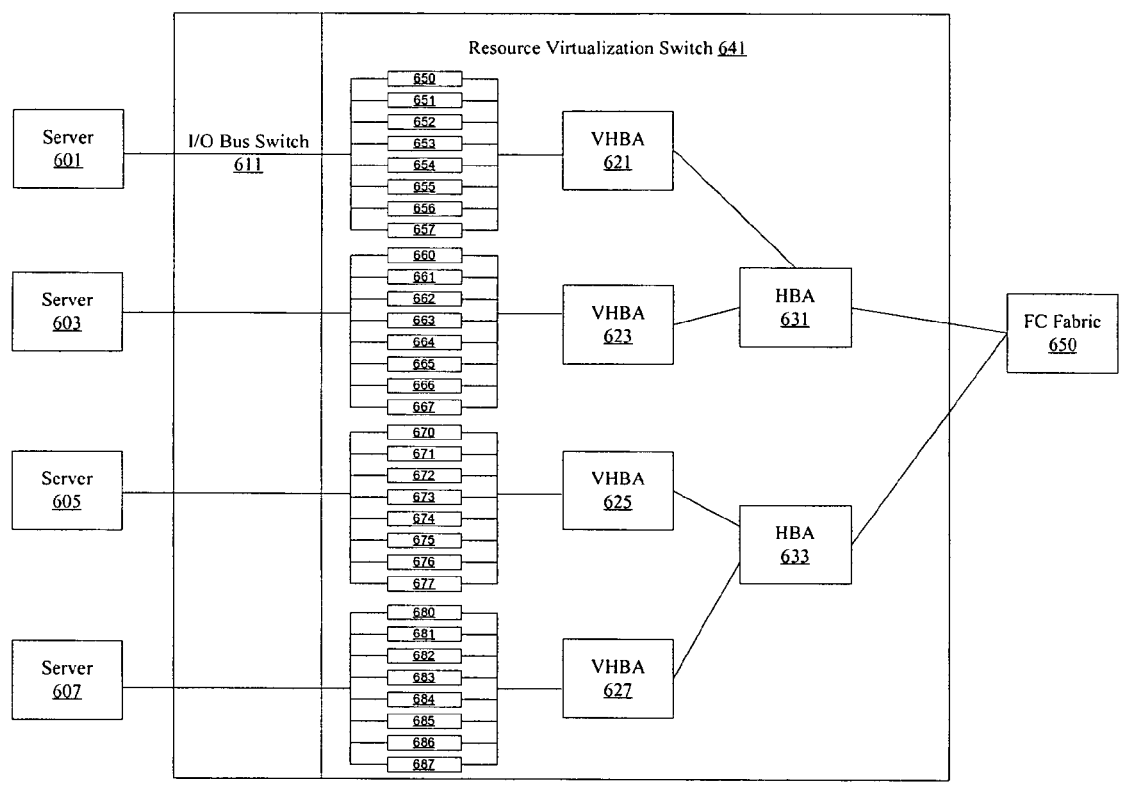
FIG. 6 is a diagrammatic representation showing one example of a VHBA coupled to one or more HBAs.

FIG. 6 is a diagrammatic representation showing multiple VHBAs of a resource virtualization switch 641. According to various embodiments, servers 601, 603, 605, and 607 are connected to VHBAs 621, 623, 625, and 627, respectively, through I/O bus switch 611. Virtual HBAs 621 and 623 are included in a first VHBA chip coupled to HBA 631, and VHBAs 625 and 627 are included in a second VHBA chip and coupled to HBA 633. In one example, server 601 communicates with multiple entities in a fibre channel fabric 650 coupled to HBA 631. Similarly, server 607 may communicate with multiple entities in the fibre channel fabric coupled to HBA 633. Any sequence of data transmissions between a source and destination in the fibre channel fabric is referred to herein as an exchange. A server may be involved in multiple exchanges.

An exchange may include a set of one or more non-concurrent related sequences passing between a pair of fibre channel ports. In one embodiment, an exchange represents a conversation such as an SCSI task. Exchanges may be bidirectional and may be short or long lived. In some examples, the parties to an exchange are identified by an Originator Exchange_Identifier (OX_ID) and a Responder Exchange_Identifier (RX_ID).

The multiple exchanges from a particular server 601 are mapped to VHBA 621. According to various embodiments, each VHBA is a logical entity mapped to a particular server. Multiple VHBAs can be included in a single device. In one embodiment, a single chip includes four VHBAs and logic for mapping OX_IDs to particular servers. Traffic from multiple VHBAs is aggregated onto a single HBA 631. According to various embodiments, HBA 631 is a conventional HBA available from Qlogic Corporation of Aliso Viejo, Calif. or Adaptec Inc. of Milpitas, Calif. Interaction between HBAs 631 and 633 appears to the fibre channel fabric as though each HBA is included in individual servers.

According to various embodiments, when a data sequence is received from a server 601 at a VHBA 621, the exchange identifier associated with the data sequence is mapped with server 601 and maintained in a database associated with VHBA 621. The HBA 631 then forwards the data in a fibre channel frame to the fibre channel fabric with the exchange identifier or some other parameter that can be used by the resource virtualization switch 641 to identify the originating server when a response is received from the fibre channel fabric.

Each VHBA 621, 623, 625, and 627 is also provided with a set of queues. For example, as shown, there are eight queues in each set. Specifically, VHBA 621 includes queues 650-657. Similarly, VHBAs 623, 625, and 627 include queues 660-667, 670-677, and 680-687, respectively. The queues are established using reliable datagram transport library and driver. The queues are managed in a PCI Express card.

Each queue of a set may have a different QoS characteristic. Each one of the queues, for instance, may have a different priority and bandwidth. Alternatively, each queue may have different combinations of priority and bandwidth.

The amount of data that can be transmitted in a fixed amount of time, via a particular queue, of course, will depend on the bandwidth of that queue. Also, the higher priority queue will be written to before a lower priority queue. The higher priority queue will also be read more frequently. Standard network flow control schemes may be used. Examples of such schemes include simple round robin and wait round robin as well as others well known to those skilled in the art.

In one embodiment, for instance, queue 650 handles requests that have a high priority and that require a lot of bandwidth. Queue 657 handles the opposite sort of request. It handles those requests that have a low priority and require very little bandwidth. Queue 651, on the other hand, handles requests that have a high priority but require little bandwidth. Queue 656 handles requests with low priority, but which require high bandwidth.

The other queues, queues 652-655, handle requests that are somewhere in between the extremes of the above-discussed requests. For example, queue 652 handles requests that have a high priority but require only a modest amount of bandwidth, while queue 653 handles requests that are of moderate priority but require high bandwidth. Queue 654, on the other hand, handles requests of low priority and moderate bandwidth, while queue 655 handles requests of moderate priority and moderate bandwidth. The queues associated with the other VHBAs may be configured in a similar fashion.

As such, traffic associated with a server application I/O request for the storage resources of the SAN may be classified based on priority and bandwidth requirements. That is, a storage application running on a server or servers can be classified according to a selected QoS requirement. This allows I/O requests across servers, for example, servers 201, 211 and 221, and requests within a server, for example, server 211, to be shaped according to the class of traffic based on its QoS requirement.

Each I/O port of the fibre channel fabric 650 may be oversubscribed by configuring multiple VHBAs on each port. For example, a fibre channel I/O port may have a rate capacity of 10G per second, while each VHBA 621 and 623 has a constant rate of 2G per second and a peak rate of 6G per second. The sum of the constant rates of the two VHBAs cannot exceed the overall bandwidth of the associated fibre channel I/O port; however, the peak rates may exceed the overall bandwidth of the port. By use of the different QoS characteristic of the queues associated with a VHBA, an oversubscribed scenario may be dealt with. That is, each VHBA would be guaranteed at least its constant rate share, while accommodating peak rates whenever possible.

Figure 7:
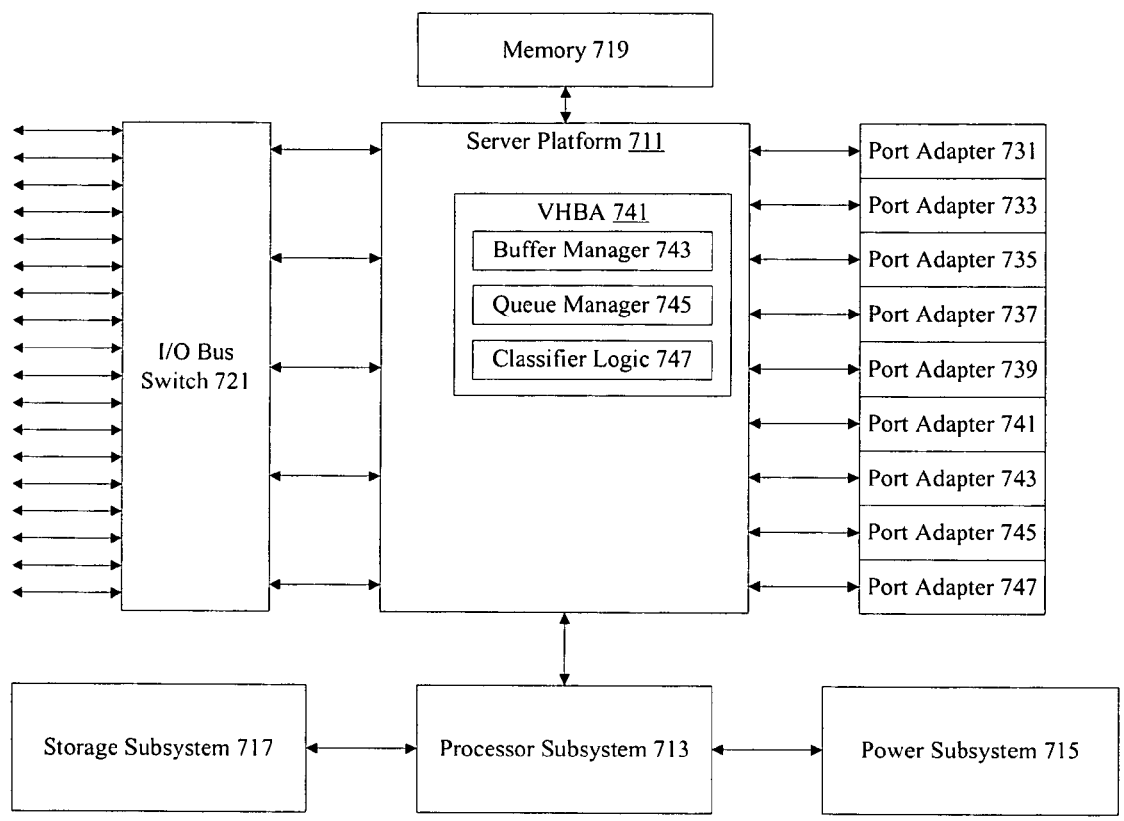
FIG. 7 is a diagrammatic representation showing a resource virtualization switch platform.

FIG. 7 is a diagrammatic representation showing one example of a resource virtualization switch. Although the techniques of the present invention do not require a resource virtualization switch, a resource virtualization switch can be used to increase system functionality and efficiency. An I/O bus switch 721 is connected to multiple computer systems using I/O buses. Port adapters 731-747 are associated with multiple resources such as NICs, HBAs, sATAs, hardware accelerators, etc. A resource virtualization switch platform 711 manages interaction between the servers connected to the I/O bus switch 721 and various resources associated with the port adapters 731-1247.

The platform 711 is associated with a memory 719 and a processor subsystem 713, a power subsystem 715, and a storage subsystem 717. In some embodiments, the platform 711 includes tables with information mapping various servers connected through the I/O bus switch 721 and various port adapter resources. The processor subsystem 713 is configured to manage port adapter resource as though the port adapters were included in individual servers. In one example, the processor subsystem 713 is configured to initiate fabric login and port login processes for HBA cards associated with a fibre channel fabric. According to various embodiments, the I/O bus switch 721 supports flexible virtual channel configuration, high availability, and dynamic port configurations. Examples of I/O bus switches include the PCI Express switch PEX 8532 available from PLX Technology, Inc. of Sunnyvale, Calif. and the PCI Express switch PES-48G available from IMC Semiconductor of Agoura Hills, Calif.

The platform 711 includes a VHBA device 741 that may be associated with one or more VHBAs mapped to particular servers. In one embodiment, the VHBA device 741 is a VHBA chip having a PCI Express interface coupled to the I/O bus switch 721 and a port adapter interface. In other examples, the VHBA chip may include an HBA port adapter and interface directly with a fibre channel fabric instead of interfacing with a conventional HBA. The VHBA chip includes classifier logic 747, a queue manager 745, and a buffer manager 743. According to various embodiments, the classifier logic 747 identifies information such as a frame's destination server and priority. The data can then be buffered in memory by buffer manager 743 and a descriptor for the data is then posted by the queue manager 745. In one embodiment, at least two queues with different QoS characteristics are provided for each connected server. Additional queues, as discussed, may be provided to handle traffic having different bandwidth requirements and levels of priority. Read, write, and control queues can also be provided. In one example, a descriptor includes parameters such as a pointer to the data in memory, a length, a source port, a multicast count, and an exchange identifier.

Each individual server may also include descriptor queues. As will be appreciated, the servers connected to the I/O Bus Switch 721 including the resource virtualization switch arbitrate for access to the I/O Bus. When access is obtained, data can be read from memory associated with one of the server based on the information provided in the descriptor queues.

More information about descriptors is provided in U.S. patent application Ser. No. 11/086,117, filed Mar. 21, 2005, (XSIGP002) by Ariel Cohen, Shreyas Shah, and Raymond Lim and titled COMMUNICATION BETWEEN COMPUTER SYSTEMS OVER AN INPUT/OUTPUT (I/O) BUS, the entirety of which is incorporated herein by reference for all purposes.

Figure 8:
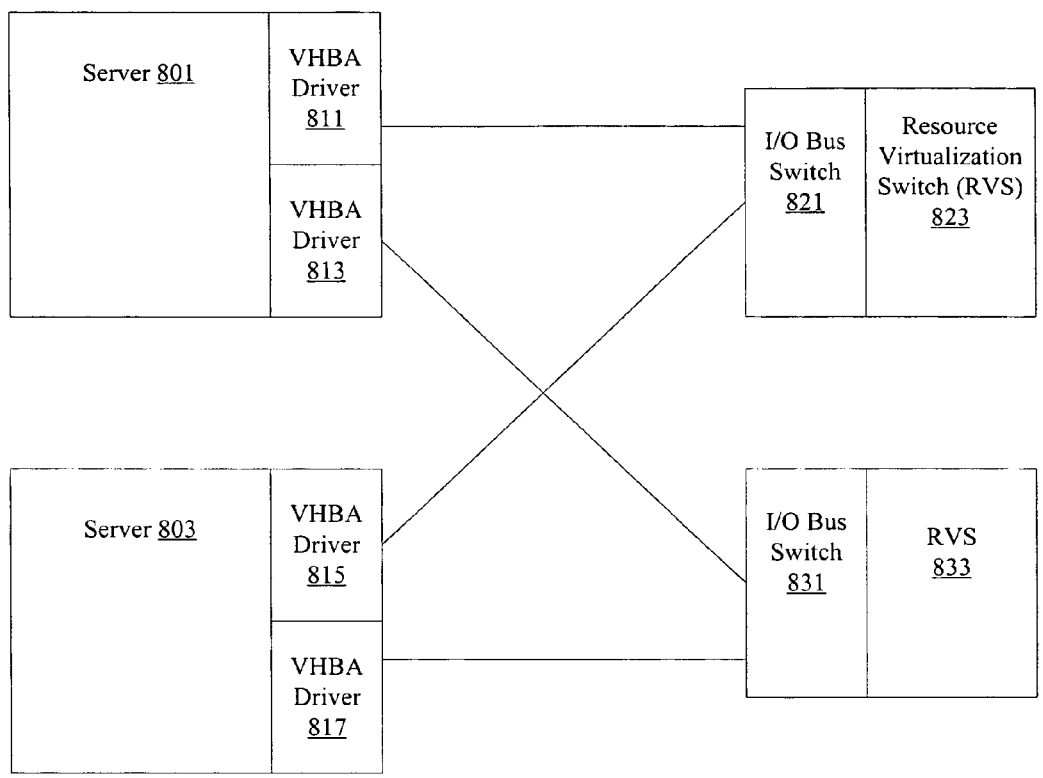
FIG. 8 is a diagrammatic representation showing multipathing and a VHBA.

Redundancy mechanisms are also provided to allow continued operation in the event that an HBA or other resource fails or a resource virtualization switch itself fails. FIG. 8 is a diagrammatic representation showing one technique for providing redundancy. Multipathing is a conventional mechanism that allows the creation of interface groups that allow standby or simultaneous operation of devices. In one example, a server includes multiple HBA cards, each associated with a device driver. One card may be active and the other standby, or the HBA cards may be used simultaneously to allow load balancing. However, requiring multiple HBA cards in conventional implementations can lead to device underutilization.

The techniques and mechanisms of the present invention contemplate providing multipathing using VHBAs. In one embodiment, multiple VHBA device drivers 811 and 813 are configured on a server 801. Multiple VHBA device drivers 815 and 817 are configured on a server 803. The VHBA device drivers are associated with different HBAs and possibly different I/O bus switches 821 and 831, and resource virtualization switches 823 and 833. In one embodiment, a server 801 includes an active VHBA driver 811 associated with resource virtualization switch 823. If the HBA in resource virtualization switch 823 fails, or the resource virtualization switch 823 itself fails, the standby VHBA driver 813 can take over operation. Switchover can occur after a period of inactivity or after failure to receive heartbeat indicators. Existing multipathing mechanisms can be used to provide for HBA redundancy and failover capabilities by using VHBA device drivers and resource virtualization switches.

Figure 9:
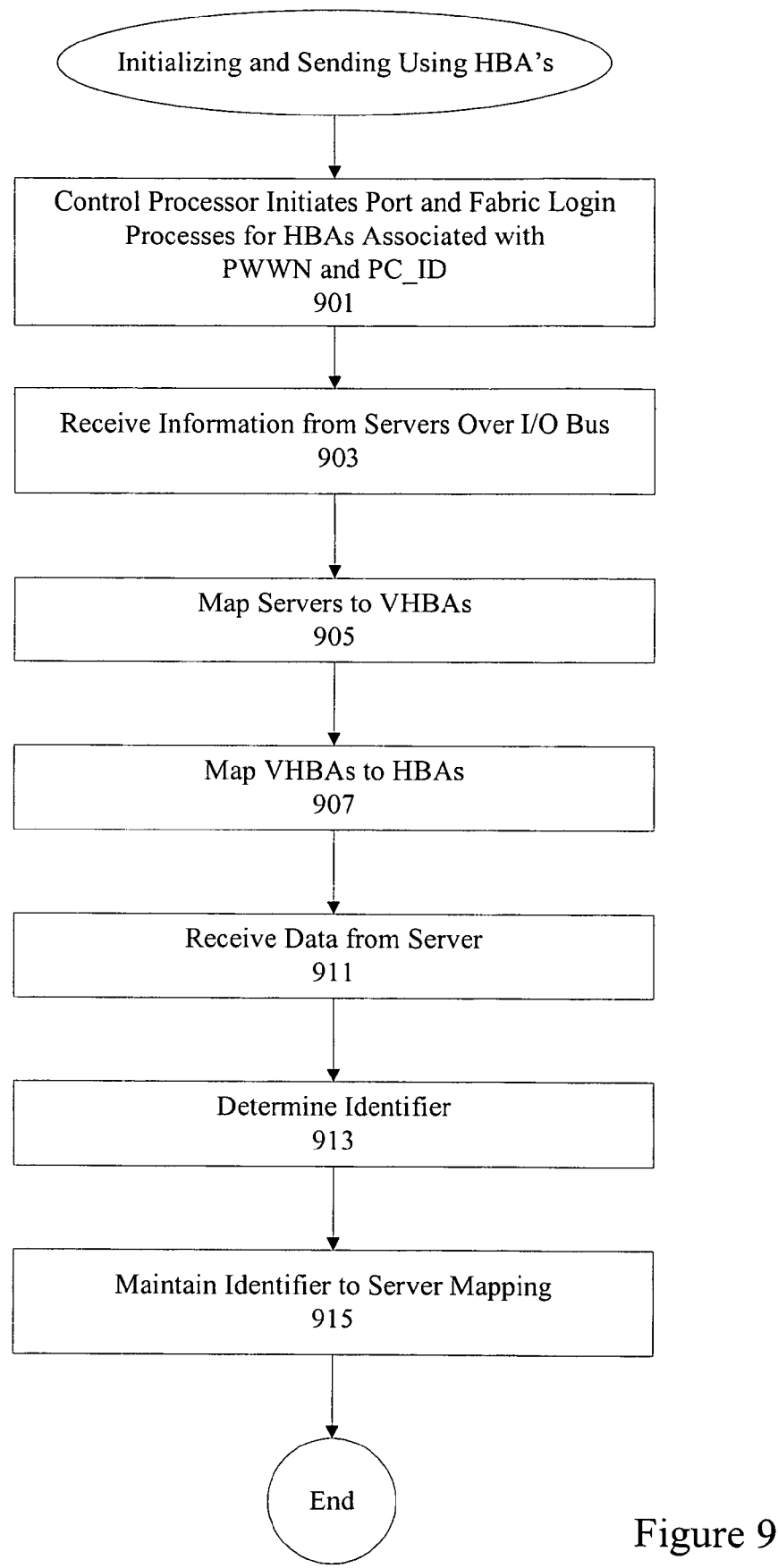
FIG. 9 is a flow process diagram showing a technique for initializing HBAs.

FIG. 9 is a flow process diagram showing one technique for initiating HBAs at a resource virtualization switch. At 901, the control processor initiates port and fabric login processes for multiple HBAs included in a resource virtualization switch. Various name server operations can also be initiated to allow recognition of the HBAs and the fibre channel fabric. In some examples, the HBAs each have port world wide names and fibre channel identifiers (ID) that allow other entities in a fibre channel fabric to communicate with the HBAs. According to various embodiments, entities in a fibre channel fabric see individual HBAs as associated with individual servers. At 903, information received from servers over an I/O bus such as the PCI Express bus is received. At 905, servers identified over the I/O bus are mapped to individual VHBAs via their associated queues. According to various embodiments, multiple VHBAs are included in VHBA chips. At 907, one or more VHBAs are mapped to individual HBAs. For example, four VHBAs mapped to four servers connected over an I/O bus are configured to share a single physical HBA.

At 911, a resource virtualization switch receives data from individual servers over the I/O bus. According to various embodiments, data is received after a resource virtualization switch obtains access to the I/O bus and reads a descriptor referencing the data to be transferred. In some examples, an identifier is determined at 913. The identifier may be an exchange identifier or other parameter. An identifier may specify a particular conversation between a source server and a destination entity in the fibre channel fabric. At 915, an identifier to server mapping is maintained. In typical instances, the identifier is maintained to allow return traffic to be routed to the appropriate server.

Figure 10:
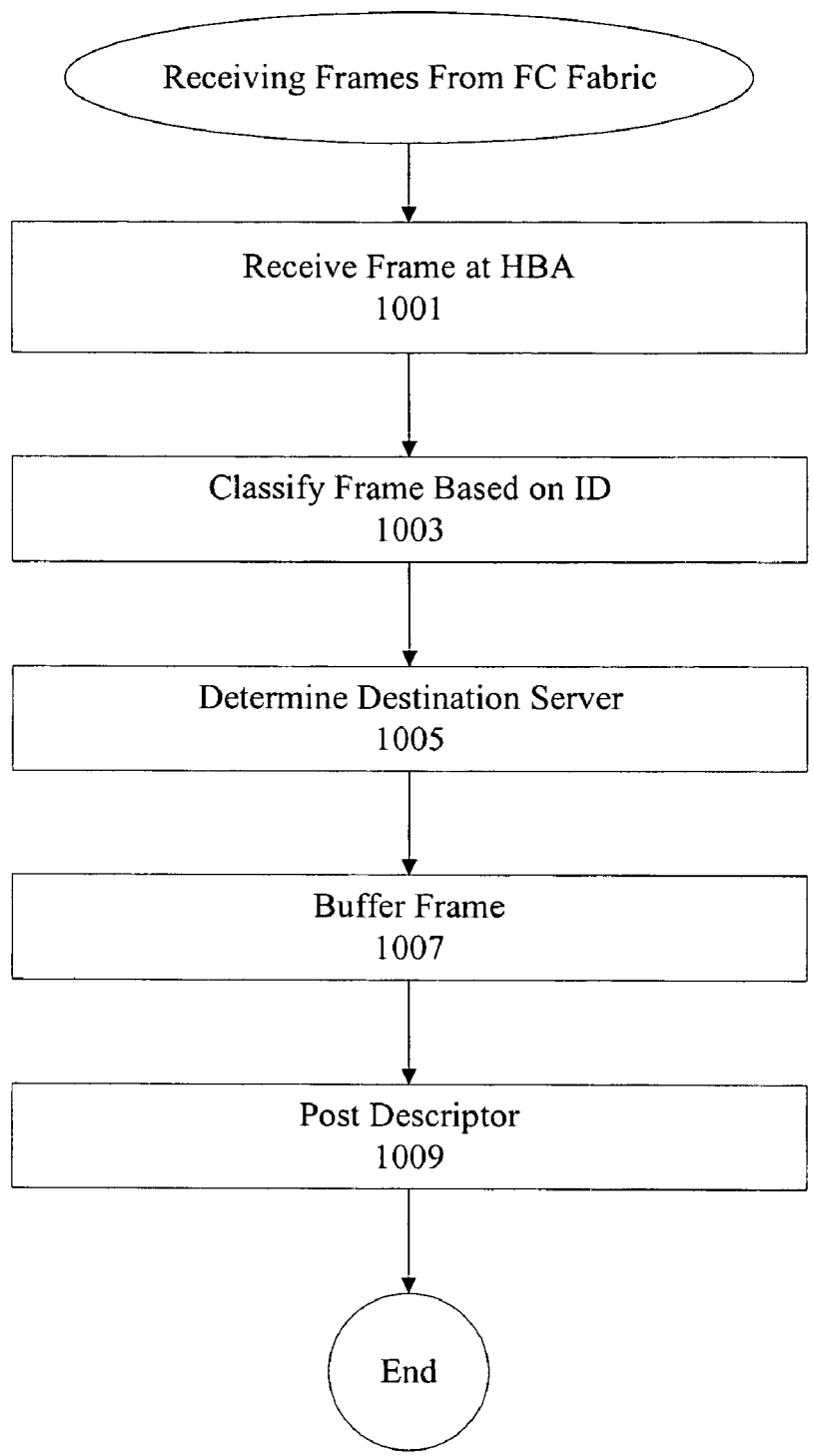
FIG. 10 is flow process diagram showing a technique for receiving using HBAs.

FIG. 10 is a flow process diagram showing a technique for receiving frames from a fibre channel fabric. At 1001, a frame is received at an HBA. According to various embodiments, the frame includes a port world wide name, a fibre channel identifier, and exchange information. At 1003, the frame is classified based on an identifier. According to various embodiments, the frame is classified using VHBA classifier logic. The frame may also be classified based on priority or other parameters. At 1005, the destination server is determined based on the identifier. In some examples, information mapping identifiers to corresponding servers is maintained by the resource virtualization switch. At 1007, the frame may be buffered. At 1009, a descriptor referencing data included in the frame is posted. In one embodiment, the descriptor is posted in a queue associated with the destination server. In other examples, the descriptor is posted in the queue associated with the QoS requirements of the data and the destination server. When the destination server is able to obtain access to the I/O bus, the descriptor and the reference data is read into the memory of the destination server.

Figure 11:
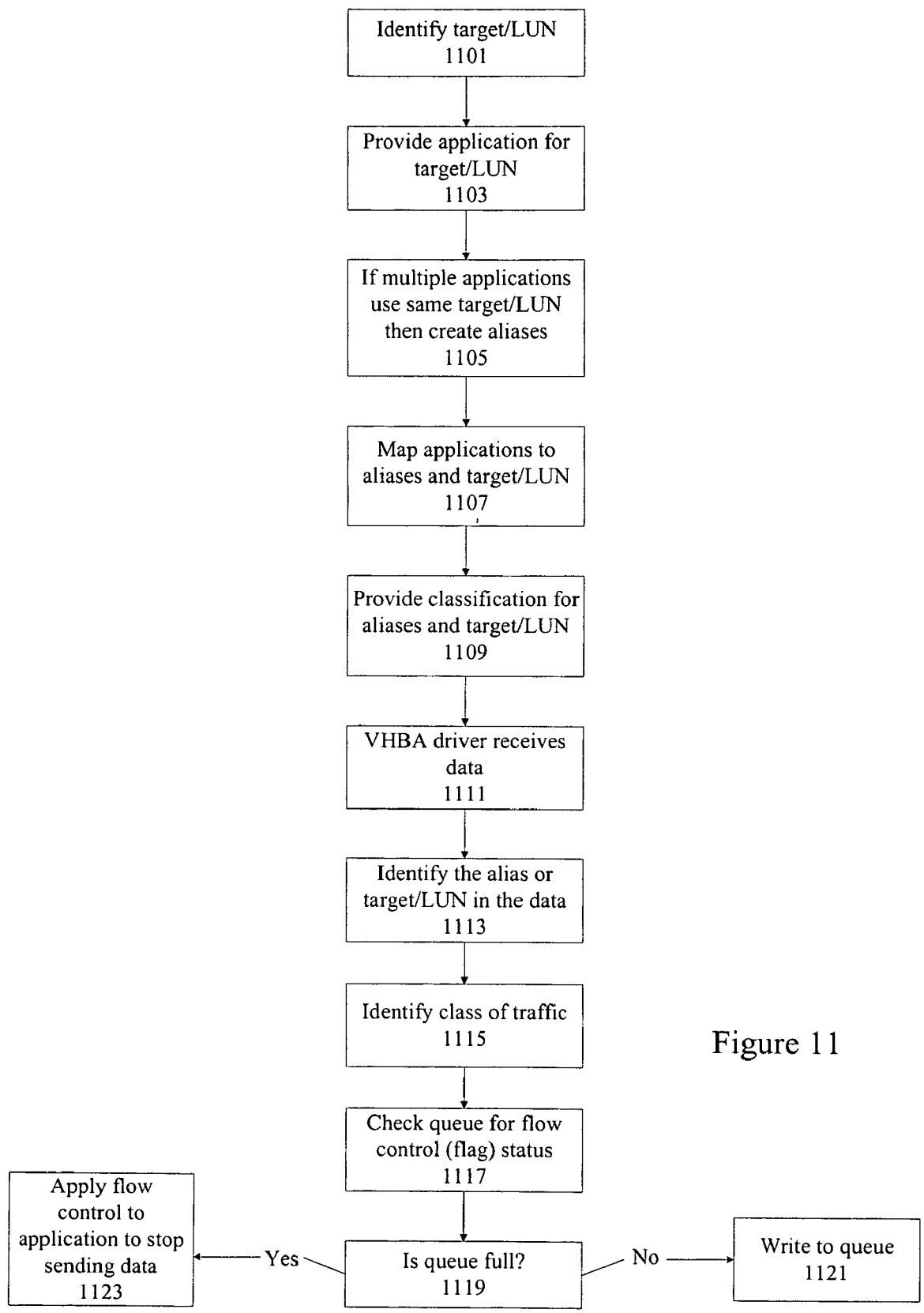
FIG. 11 is a flow process diagram showing a technique for providing QoS for storage applications on a server.

FIG. 11 is a flow process diagram showing one technique for providing QoS for storage applications on a server. At 1101, a storage resource of the SAN is identified by its LUN id and target id. At 1103, a particular server application is provided for an identified storage resource. If multiple applications use the same storage resource, then, at 1105, an alias is created for the storage resource. For instance, if two applications use the same storage device, then the storage device is given an alias. It will be assigned one LUN id and target id. for a first application and another LUN id and target id for the second application. Thus, applications with different QoS requirements can be supported by the same storage resource.

The server applications, at 1107, are mapped to the aliases, if present, and the identified storage resources. At 1109, the identified storage resources and any aliases are classified based on their QoS requirements, such a high priority and low bandwidth or low priority and high bandwidth, etc.

At 1111, a VHBA driver, for example, VHBA driver 511 (see FIG. 5) receives a storage application I/O request or data. The driver, at 1113, identifies the alias or the identified storage resource in the data. At 1115, the class of traffic is identified, that is, its QoS requirements, based on the alias or the identified storage resource.

Before writing to a particular queue, for example, one of the queues 670-677 of the VHBA 625 (see FIG. 6), the flow control status (flag) of the queue is checked. This occurs at 1117 and 1119. If the queue is not full, it can be written to as represented at 1121. However, if a queue is full, as represented at 1123, a flow control technique, as is well known in the art, is applied to stop the application from sending data from the server.

In addition, although exemplary techniques and devices are described, the above-described embodiments may be implemented in a variety of manners. For instance, instructions and data for implementing the above-described invention may be stored on fixed or portable storage media. Hardware used to implement various techniques may be embodied as racks, cards, integrated circuited devices, or portions of semiconductor chips. Accordingly, the present embodiments are to be considered as illustrative and not restrictive, and the invention is not to be limited to the details given herein, but may be modified within the scope and equivalents of the appended claims.

What is claimed is:

1. A resource virtualization switch coupled to a fibre channel fabric comprising:
   a plurality of physical port adapters connected to a fibre channel fabric;
   a resource virtualization switch platform operable to map communications received at the resource virtualization switch from a plurality of servers to a selected one of the plurality of physical port adapters; and
   a plurality of queues having different quality of service (QoS) characteristics to provide QoS for an application request by the plurality of servers for a storage resource associated with the fibre channel fabric.

2. The resource virtualization switch of claim 1 wherein the QoS characteristics include priority, bandwidth, or a combination of priority and bandwidth.

3. The resource virtualization switch of claim 1 wherein multiple applications use the same storage resource and the resource is assigned an alias.

4. The resource virtualization switch of claim 1 wherein storage resource is part of a storage area network.

5. A resource virtualization switch coupled to a fibre channel fabric, the resource virtualization switch comprising:
   a processor;
   memory;
   a plurality of physical port adapters including at least a first physical port adapter and a second physical port adapter, the plurality of physical port adapters connected to a fibre channel fabric, the fibre channel fabric including a plurality of fibre channel ports associated with fibre channel switches;
   an I/O bus switch connected to a plurality of servers including at least a first server and a second server; and
   a resource virtualization switch platform operable to map communications received at the resource virtualization switch from the first server and the second server onto the first port adapter, the resource virtualization switch platform including multiple queues with different quality of service (QoS) characteristics to provide QoS for storage applications on the first and second servers.

6. The resource virtualization switch of claim 5, wherein the port adapters are Host Bus Adapters (HBAs).

7. The resource virtualization switch of claim 6, wherein the first server includes a first virtual HBA driver.

8. The resource virtualization switch of claim 7, wherein the first server further includes a second virtual HBA driver.

9. The resource virtualization switch of claim 8, wherein the first and second virtual HBA drivers are used for redundancy and load sharing.

10. The resource virtualization switch of claim 8, wherein the first and second virtual HBA drivers are used for multipathing.

11. The resource virtualization switch of claim 10, wherein the first and second virtual HBA drivers are coupled to different resource virtualization switches.

12. The resource virtualization switch of claim 5, wherein the first port adapter is coupled to a first fibre channel port and the second port adapter is coupled to a second fibre channel port.

13. The resource virtualization switch of claim 5, wherein the I/O bus switch is a PCI Express switch.

14. A resource virtualization switch coupled to a fibre channel fabric, the resource virtualization switch comprising:
   a processor;
   memory;
   a plurality of physical port adapters, the plurality of physical port adapters connected to a fibre channel fabric, the fibre channel fabric including a plurality of fibre channel ports associated with fibre channel switches;
   an I/O bus switch connected to a plurality of servers including at least a first server and a second server; and
   a resource virtualization switch platform operable to map communications received at the resource virtualization switch from the first server and the second server onto one of the plurality of physical port adapters, the resource virtualization switch platform including multiple queues with different quality of service (QoS) characteristics to provide QoS for requests by storage applications on the first and second servers for a storage resource associated with the fibre channel fabric, the resource virtualization switch platform including a plurality of virtual port adapters, each virtual port adapter associated with at least one queue and at least one physical port adapter.

15. A resource virtualization switch coupled to a fibre channel fabric, the resource virtualization switch comprising:
   a processor;
   memory;
   a plurality of physical port adapters including at least a first physical port adapter and a second physical port adapter, the plurality of physical port adapters connected to a fibre channel fabric, the fibre channel fabric including a plurality of fibre channel ports associated with fibre channel switches;
   an I/O bus switch connected to a plurality of servers including at least a first server, a second server, a third server, and a fourth server; and
   a resource virtualization switch platform operable to map communications received at the resource virtualization switch from the first server and the second server onto the first physical port adapter and operable to map communications from the third server and the fourth server onto the second physical port adapter, the resource virtualization switch platform including multiple queues with different quality of service (QoS) characteristics to provide QoS for requests by storage applications on the first, second, third, and fourth servers for a storage resource associated with the fibre channel fabric, the resource virtualization switch platform including a plurality of virtual port adapters, each virtual port adapter associated with at least one queue and at least one physical port adapter.

16. A method for mapping communications at a resource virtualization switch coupled to a fibre channel fabric, the fibre channel fabric including a plurality of fibre channel ports associated with fibre channel switches, the resource virtualization switch including a processor, memory, and an I/O bus switch, the method comprising:
   receiving a first communication from a first server connected to the I/O bus switch;
   enqueuing information associated with the first communication in selected ones of a plurality of queues, the plurality of queues having different quality of service (QoS) characteristics to provide QoS for requests by storage applications on servers connected to the I/O bus switch for one or more storage resources associated with the fibre channel fabric;
   receiving a second communication from a second server connected to the I/O bus switch;

enqueuing information associated with the second communication in selected ones of the plurality of queues;

mapping information associated with the first communication onto a first physical port adapter connected to the fibre channel fabric; and mapping information associated with the second communication onto the first physical port adapter.

17. A resource virtualization switch coupled to a fibre channel fabric, the fibre channel fabric including a plurality of fibre channel ports associated with fibre channel switches, the resource virtualization switch including a processor, memory, and an I/O bus switch, the resource virtualization switch further comprising:

means for receiving a first communication from a first server connected to the I/O bus switch;

means for enqueuing information associated with the first communication in selected ones of a plurality of queues, the plurality of queues having different quality of service (QoS) characteristics to provide QoS for requests by storage applications on servers connected to the I/O bus switch for one or more storage resources associated with the fibre channel fabric;

means for receiving a second communication from a second server connected to the I/O bus switch;

means for enqueuing information associated with the second communication in selected ones of the plurality of queues;

means for mapping information associated with the first communication onto a first physical port adapter connected to the fibre channel fabric; and means for mapping information associated with the second communication onto the first physical port adapter.

* * * * *

UNITED STATES PATENT AND TRADEMARK OFFICE
CERTIFICATE OF CORRECTION

PATENT NO.      : 7,602,774 B1                                      Page 1 of 1
APPLICATION NO. : 11/179437
DATED           : October 13, 2009
INVENTOR(S)     : Sundaresan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 810 days.

Signed and Sealed this

Fifth Day of October, 2010

David J. Kappos
*Director of the United States Patent and Trademark Office*